INVENTOR
LOUIS COLIN

Aug. 11, 1959     L. COLIN     2,899,241
TRACTION INCREASING DEVICE FOR VEHICLE WHEELS
Filed Feb. 27, 1957     5 Sheets-Sheet 2
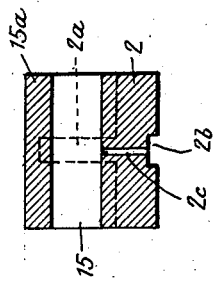
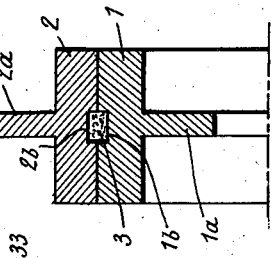
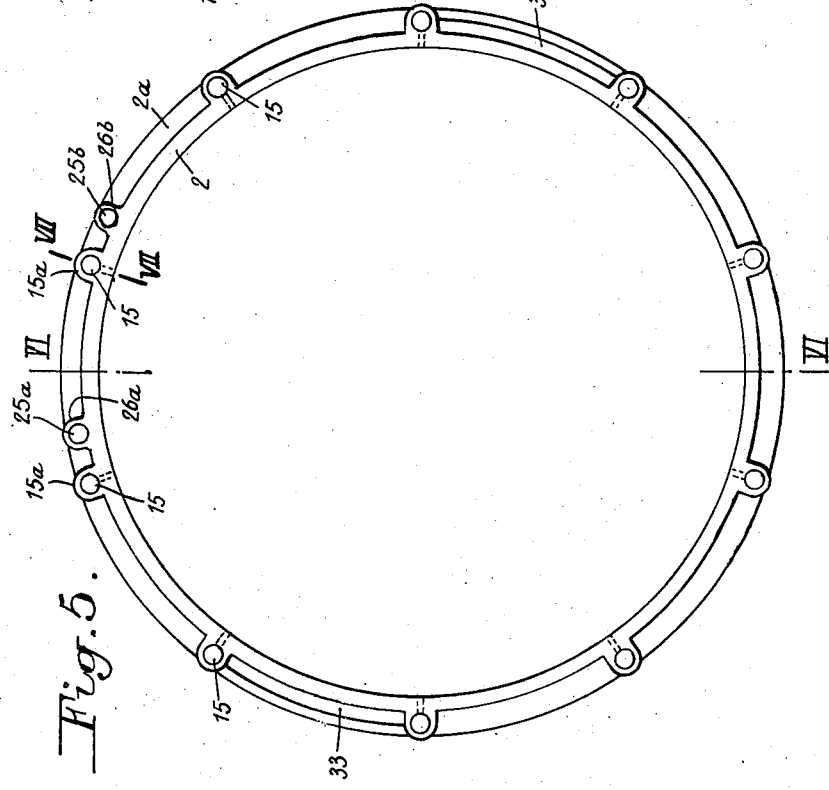
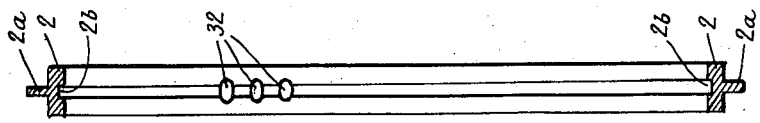
INVENTOR
LOUIS COLIN Aug. 11, 1959     L. COLIN     2,899,241
TRACTION INCREASING DEVICE FOR VEHICLE WHEELS
Filed Feb. 27, 1957     5 Sheets-Sheet 3
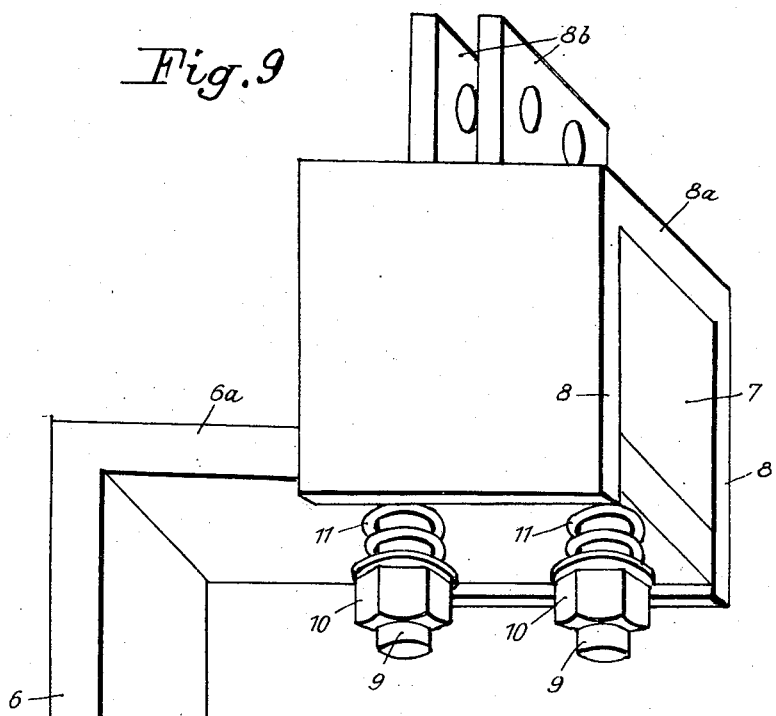
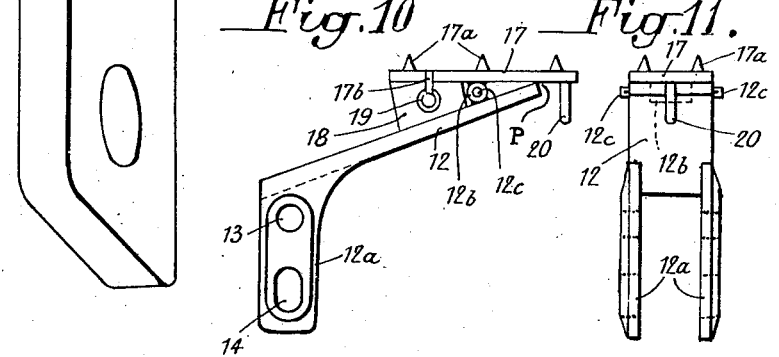
INVENTOR
LOUIS COLIN Aug. 11, 1959    L. COLIN    2,899,241
TRACTION INCREASING DEVICE FOR VEHICLE WHEELS
Filed Feb. 27, 1957    5 Sheets-Sheet 4
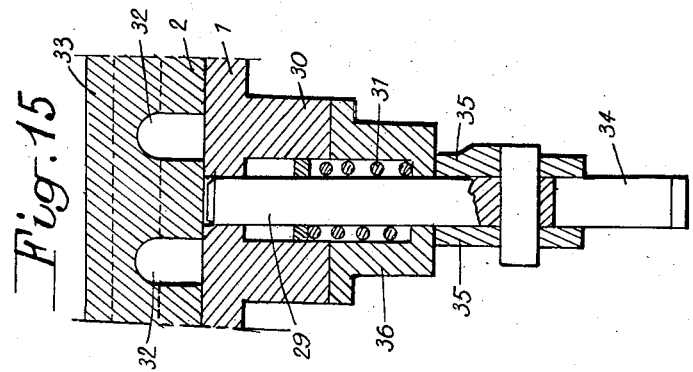
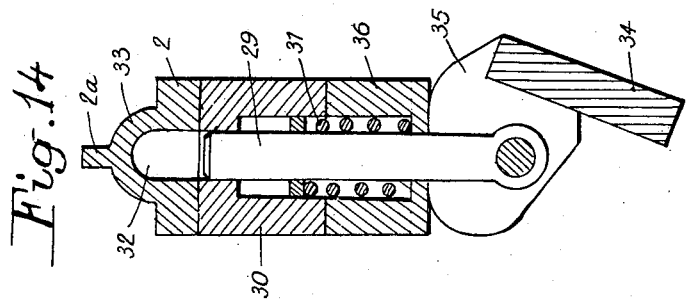
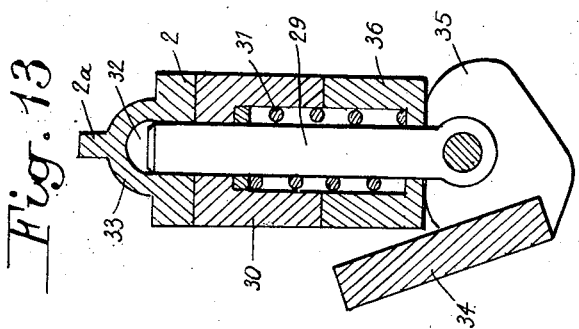
INVENTOR
LOUIS COLIN Aug. 11, 1959     L. COLIN     2,899,241
TRACTION INCREASING DEVICE FOR VEHICLE WHEELS
Filed Feb. 27, 1957     5 Sheets-Sheet 5
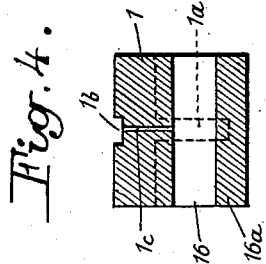
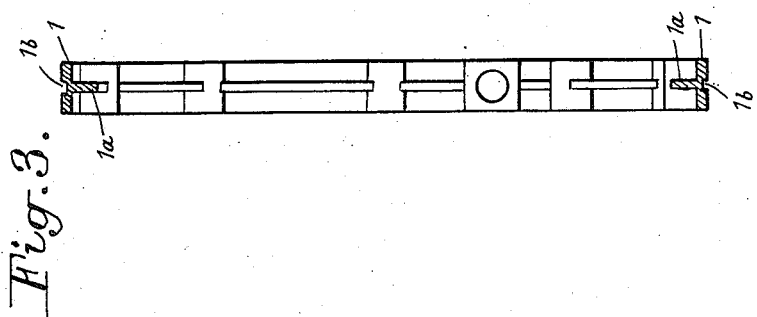
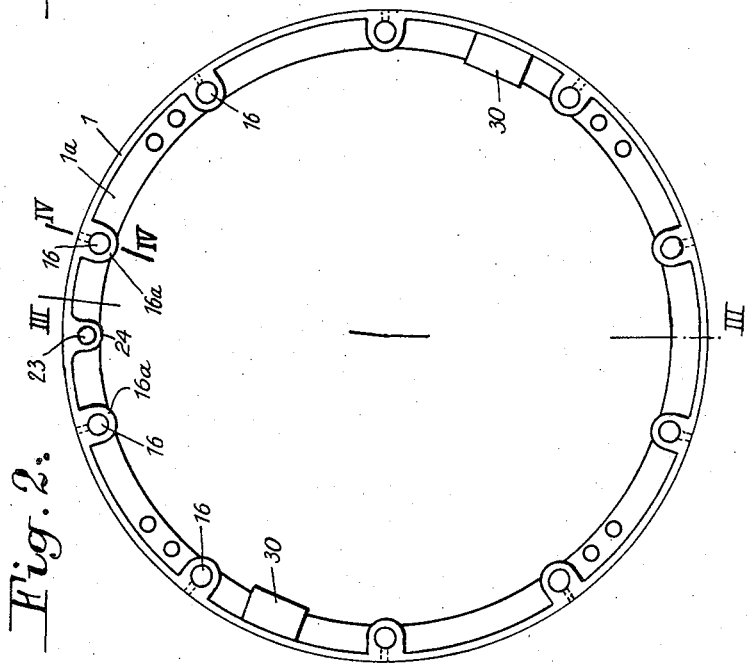
INVENTOR
LOUIS COLIN
BY

United States Patent Office 2,899,241
Patented Aug. 11, 1959

2,899,241

TRACTION INCREASING DEVICE FOR VEHICLE WHEELS

Louis Colin, Quimper, France

Application February 27, 1957, Serial No. 642,702

Claims priority, application France March 1, 1956

4 Claims. (Cl. 301—47)

The invention relates to improvements applied to devices for increasing the grip of the wheels of automobile vehicles, more particularly farm tractors, of the kind comprising retractable traction teeth, whose positioning for service and positioning for the road are obtained by the displacements of a mobile ring—carrying the joints of said traction teeth—in relation to a fixed ring, inside the preceding one.

According to one characteristic arrangement of the invention, the two rings are each made in a T-section, and are in contact by their shoes in which two peripherical grooves are cut, which, by their junction, form a duct in which a mass of grease is contained, favorizing the slipping of the external ring on the internal ring.

On the other hand, the groove of the mobile ring communicates, through small ducts, with the housings of the joint spindles of the traction teeth provided in this ring, whereas the groove of the fixed ring communicates, in like manner, with the housing of spindles carried by this ring and each passing through an ovalized hole of the controlling arm of the corresponding traction tooth.

Advantageously, each traction tooth is provided with a removable shoe supplied with spikes on its face intended to come into contact with the ground, said shoe being hinged on the blade of the traction tooth and carrying on its opposite face a resilient plug inserted between this shoe and said blade, and an abutment at its end for fixing its road position.

This shoe is particularly useful on snow or glazed ice, both when at work as well as when returning on the road. It may be removed at will.

The control of the movements of the traction teeth is effected by means of a jack provided with two pins, one on the fixed part, the other on the movable part thereof, which are engaged into holes provided, some in the fixed ring, the others in the movable ring and/or in a certain number of traction teeth.

On the other hand, the fixed ring is attached to an annular cheek carried on the wheel, by means of devices each comprising an angle bracket fixed on the cheek and whose wing perpendicular to the latter is connected, by bolts passing through a resilient block, to the shoe of a U-piece which embraces this block and this wing and is integral with a bracket mounted astride on the web of the T-piece forming the fixed ring, the nuts of the aforementioned bolts bearing on springs.

Lastly, to secure the locking of the traction teeth in various positions, including the extreme positions, the fixed ring is cast with cylindrical bosses each of them housing a radial bolt which can be engaged, under the action of a spring, into one of a plurality of holes made in the movable ring, and disengaged therefrom by the action of a lever actuated cam.

The attached drawing show, by way of example, an embodiment of a gripping device according to the invention.

Figure 2 is a front view of the interior, fixed ring.

Figure 3 is a section taken along the line III—III of Fig. 2.

Figure 4 is a partial section on a larger scale, taken along the line IV—IV of Fig. 2.

Figure 5 is a front view of the external, movable ring.

Figure 6 is a section taken along the line VI—VI of Fig. 5.

Figure 7 is a partial section on a larger scale taken along the line VII—VII of Fig. 5.

Figure 8 is a partial section of both rings in position, one around the other.

Figure 9 is a perspective view of one of the connecting devices between the internal ring and the wheel.

Figure 10 is an elevational view of a traction tooth provided with its removable shoe.

Figure 11 is a corresponding side view.

Figure 13 is a section of a locking device, on a larger scale, taken along the line XIII—XIII of Fig. 1.

Figure 14 is a similar view, showing the same device in the unlocking position.

Figure 15 is a section perpendicular to that of Fig. 14 and in which the movable ring has been displaced in relation to its position in said Fig. 14.

Figures 1, 12:
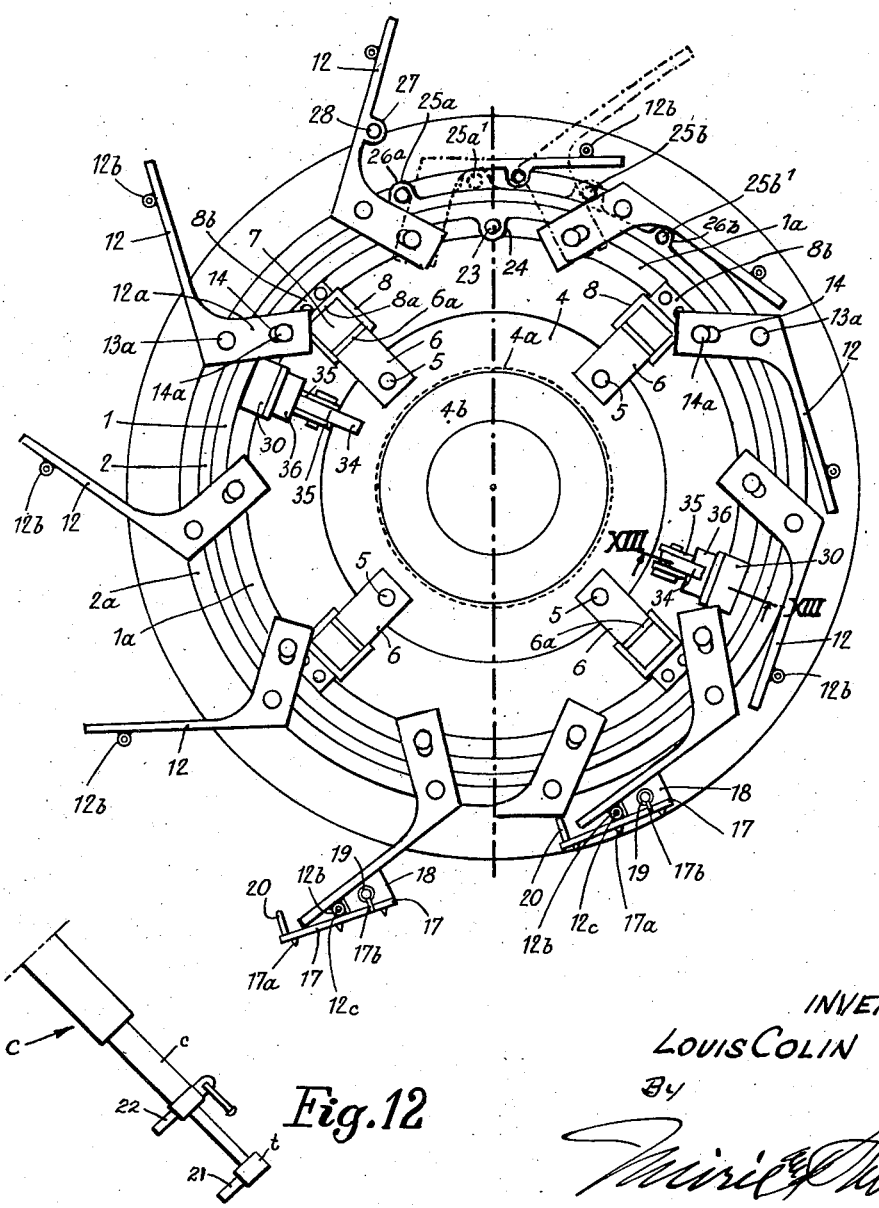
Figure 1 is a front view of the unit in which the traction teeth on the left half are in the working position, whereas the traction teeth on the right half are in the retracted or road position (in this view, only two traction teeth have been shown with their removable shoe).
Figure 12 is a partial length-wise view of a jack that can be used for controlling the movements of the movable ring with regard to the fixed ring.

In these drawings, 1 designates the internal ring, which is fixed, and 2 the external, movable ring. These two rings, made of cast steel, are each made in a T-section and are oppositely arranged that their cross portions are in contact and the web 1a of the T of the fixed ring is directed towards the inside, whereas the web 2a of the T of the movable ring is directed towards the outside (Fig. 8). Each of the shoes is provided with a groove, respectively 1b, 2b, which extend right round its periphery, and the two connected grooves (see Fig. 8) form an annular duct 3 which is filled with a mass of grease, so that part of the latter, in penetrating between the two shoes, favorizes the slipping of one on the other. Obviously, lubricators (not shown) enable the grease to be renewed from time to time.

For the purpose of attaching the internal ring 1 to the wheel, the latter is provided with an annular cheek 4 integral with a cylindrical flange 4a which is itself integral with a central crown 4b which is fixed, by bolts, to the web of said wheel. Angle brackets 6, four in number, for example, are fixed on the cheek 4 from point to point, by bolts 5. The wing 6a of each of these angle brackets, which is directed perpendicularly to the plane of the cheek 4, supports a block 7 of rubber or other resilient material. This block 7 and wing 6a are embraced by a U-shaped part 8 (Fig. 9) whose web 8a is connected to said wing 6a by bolts 9 and nuts 10 screwed on the latter, bearing on springs 11, said web being on the other hand integral with a bracket 8b placed cross-wise on the web 1a of the T of the fixed ring and bolted to the latter.

Thus, the fixed ring is resiliently connected to the wheel, in the radial direction, which damps relative movements, in this direction, of the gripping system in relation to the wheel.

Each of the traction teeth comprises a blade 12 integral with a bracket 12a, both made of cast steel. The bracket 12a straddles the two rings 1 and 2 and thus opposes any relative movement of these rings in the axial direction. The two flanges of this bracket are drilled with a round hole 13 which is traversed by the pivot spindle 13a of the traction tooth on the movable ring 2, and the part situated beyond this pivot and forming the control arm of the traction tooth has an ovalized hole 14 through which passes a spindle 14a forming the connection with the fixed ring, whose reaction imparts an angular movement to the traction tooth when the spindle 13a is displaced. The spindles 13a and 14a respectively pass through holes 15 and 16 (see Figs. 5 and 2) drilled in strengthening bosses 15a and 16a of the movable ring and the fixed ring, which holes communicate by small ducts, respectively 2c and 1c (Figs. 7 and 4), with the grooves 2a and 1a and thus with the duct 3 holding the grease.

The blade 12 of each traction tooth (see Figs. 10 and 11) carries an element 12b of a hinge whose other elements are carried by a shoe 17 which may be removably mounted on the blade 12 by means of a spindle 12c retained, for example, by pins. This shoe is provided, on its surface that comes into contact with the ground, with spikes 17a of special steel and of a suitable number. On its opposite face it carries a resilient plug 18 which is retained by lugs 17b, a tube 19 and a bolt, said plug being inserted between the shoe 17 and the blade 12 and acting as a spring, ensuring at P the contact between said shoe and said blade and preventing said shoe from rocking. Lastly, at its end, the shoe 17 has an abutment 20 which, in the road position (see Fig. 1 at the bottom right) bears on the adjacent traction tooth and gives the shoe 17 a position in which it is parallel with a tangent to the tyre drawn perpendicularly to a radius passing through the axis 12c.

The shoes 17 are particularly useful in the event of snow or glazed ice existing, both for work as well as returning on the road. They can be easily removed at will, by removing the spindle 12c.

It will easily be understood that when the movable ring 2 moves counterclockwise in relation to the fixed ring, together with the spindles 13a, the reaction of the spindles 14a causes the traction teeth to "open," which assume the position shown in the left half of Fig. 1, from which a rotation of the movable ring in the opposite direction causes them to retract into the road position shown on the right-hand half of Fig. 1, each movement being terminated when the spindles 14a are at the end of the ovalized holes 14 of the traction teeth arms.

For effecting these relative displacements of the movable ring, the invention provides for the use of a jack C (Fig. 12) of any kind, specially fitted, for this purpose, with two parallel pins, the one, 21, on the movable head t of the jack, the other, 22, at the end of the fixed body c of the jack, these two pins being intended to co-operate with holes provided, some on the fixed ring, the others on the movable ring and/or on a certain number of traction teeth.

Presuming that the jack is, for example, of the double-acting variety, of such type that it can produce the same force in both of the displacement directions of its movable head, it will only be necessary, for each of the holes made in the fixed ring, to provide a hole in the movable ring, and eventually in an adjacent special traction tooth.

In the embodiment shown in the drawings, it is presumed that the jack used can only exert force in the advance direction of the movable head, or in other words in the direction where the two pins 21, 22 move apart from each other, in which case two holes are required in the movable ring for each hole in the fixed ring.

The fixed ring has several holes 23 (in the drawings only one is shown) each drilled in a strengthening boss 24, and for each of these holes the movable ring has two holes 25a, 25b, drilled in the bosses 26a, 26b. In Fig. 1 the reference numerals 25a and 25b designate these holes in the working position of the device, whereas the reference numerals $25a^1$ and $25b^1$ designate the same holes in the road position of the device. Furthermore, a special traction tooth can be provided whose blade 12 comprises a lug 27 with a hole 28 drilled in it.

The traction teeth being in the road position (right-hand half of Fig. 1), to bring them into the working position, it is only necessary, after having adjusted the width between the pins 21 and 22, to insert the pin 22 into the hole 23 and the pin 21 into the hole $25a^1$, and to operate the jack in the direction of the relative separation of these pins, the hole $25a^1$ being displaced until it reaches the position 25a.

It would also be possible to use the hole 23, on the one hand, and the hole 28 of the special traction tooth, on the other hand.

To bring the traction teeth from the working position (left-hand half of Fig. 1) back to the road position (right-hand half of Fig. 1), the pin 22 is engaged into the hole 23 and the pin 21 into the hole 25b that must be brought, by means of the jack, into the position $25b^1$.

It is also possible—and this may frequently be necessary—simply to move the tractor forward, the traction teeth being unlocked. The latter will then descend until they tangent the running track, following which, if necessary, the movement may be terminated by using the jack.

The present grip increasing system is completed by means that enable the traction teeth to be locked in either of the two extreme positions, as well as in one or more intermediate positions, if so desired.

For this purpose, two radial and diametrally opposed bolts 29 may be provided, for example, each of them (see Figs. 13 to 15) being housed in a cylindrical boss 30 of the fixed ring 1 and able to penetrate as shown on Fig. 13, under the action of a spring 31, into one of the holes 32 made to the required number in the movable ring 2, which is strengthened in the corresponding area by a rib 33. Unlocking is effected by passing from the position of Fig. 13 to that of Fig. 14, by means of a lever 34, a double cam 35 which, when pressed on the bottom of a part 36 forming the housing of the bolt and spring 31, moves said bolt towards the central axis of the system, by compressing said spring (Fig. 14). Preferably, the arrangement is such that each bolt 29 is automatically opposite to a hole 32 when the traction teeth are at the end of their stroke, in one or the other of their extreme positions. For the intermediate position or positions, guide marks can be provided on the movable ring.

It goes without saying that the invention is by no means restricted to embodiment described and shown, of which it includes any modifications, within the scope of the appended claims.

I claim:

1. A device for increasing the grip of the wheels of tractors and other automotive vehicles, comprising a fixed ring adapted to be secured to the vehicle wheel, a movable ring rotatably mounted on the peripheral surface of said fixed ring, traction teeth pivotally mounted on said movable ring, control means on said fixed ring and engaging said traction teeth to swing said teeth on their pivots upon rotation of said movable ring about said fixed ring, a ground engaging shoe hingedly and detachably mounted on each of said teeth, spikes on the ground-engaging face of said shoe and a resilient plug inserted between said shoe and its respective tooth.

2. A device according to claim 1 comprising an abutment on the end of each shoe and engageable with the adjacent tooth to position said shoe perpendicular to the wheel radius passing through its hinge axis and parallel to a tangent of the tire adjacent said shoe.

3. A device for increasing the grip of the wheels of tractors and other automotive vehicles, comprising a fixed ring adapted to be secured to the vehicle wheel, a movable ring rotatably mounted on the peripheral surface of said fixed ring, traction teeth pivotally mounted on said movable ring, control means on said fixed ring engaging said traction teeth to swing said teeth on their pivots upon rotation of said movable ring about said fixed ring, said rings being each of T-shaped cross section and oppositely arranged with their cross portions in contact, each of said rings being formed with a peripheral groove on its surface engaging the other of said rings, said grooves facing each other and forming a duct adapted to contain a lubricating substance.

4. A device as claimed in claim 3, wherein said movable ring is formed with housings for the pivotal mountings of said traction teeth, each of said housings being connected by a channel to said groove of said movable ring, and said fixed ring is formed with other housings for said control means, each of said other housings being connected by a channel to said groove of said fixed ring.

References Cited in the file of this patent

UNITED STATES PATENTS

| | | |
|---|---|---|
| 1,815,147 | Hill | July 21, 1931 |
| 2,256,379 | Chaffin | Sept. 16, 1941 |
| 2,638,384 | Colin | May 12, 1953 |
| 2,693,985 | Colin | Nov. 5, 1954 |

FOREIGN PATENTS

| | | |
|---|---|---|
| 900,056 | France | June 19, 1945 |
| 62,944 | France | June 30, 1955 |

(First addition of 1,042,787)